(12) United States Patent
Asami

(10) Patent No.: US 11,813,954 B2
(45) Date of Patent: Nov. 14, 2023

(54) ONBOARD SYSTEM

(71) Applicant: TOYOTA JIDOSHA KABUSHIKI KAISHA, Toyota (JP)

(72) Inventor: Takayuki Asami, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 268 days.

(21) Appl. No.: 17/363,130

(22) Filed: Jun. 30, 2021

(65) Prior Publication Data
US 2022/0032807 A1   Feb. 3, 2022

(30) Foreign Application Priority Data
Jul. 30, 2020 (JP) ................. 2020-129764

(51) Int. Cl.
*B60L 53/66* (2019.01)
*H02J 7/00* (2006.01)
*B60L 58/13* (2019.01)

(52) U.S. Cl.
CPC ............... *B60L 53/66* (2019.02); *B60L 58/13* (2019.02); *H02J 7/00034* (2020.01); *B60L 2210/10* (2013.01); *B60L 2240/547* (2013.01); *H02J 2310/48* (2020.01)

(58) Field of Classification Search
CPC ...... B60L 53/66; B60L 58/13; B60L 2210/10; B60L 2240/547; H02J 7/00034; H02J 2310/48; H02J 7/0048; H02J 7/04; H02J 7/342; Y02T 10/70; Y02T 10/7072; Y02T 10/72; Y02T 90/12; Y02T 90/16; B60R 16/02; B60R 16/03

USPC ......................................................... 320/104
See application file for complete search history.

(56) References Cited

U.S. PATENT DOCUMENTS

| 2007/0210743 | A1* | 9/2007 | Tabei ...................... B60L 58/20 320/104 |
| 2016/0046199 | A1* | 2/2016 | Butler ..................... H02J 7/005 320/106 |
| 2019/0108010 | A1* | 4/2019 | Tillman ................... H04L 67/12 |
| 2020/0215930 | A1* | 7/2020 | Izumi ....................... B60R 16/02 |

FOREIGN PATENT DOCUMENTS

| JP | 2011-121396 A | 6/2011 |
| JP | 2019-064424 A | 4/2019 |

* cited by examiner

*Primary Examiner* — Paul Dinh
(74) *Attorney, Agent, or Firm* — Oliff PLC

(57) ABSTRACT

When software of a first electronic control unit that controls charging of an auxiliary machinery battery from a power supply by controlling a charging device is rewritten, an onboard system is configured so that charging of the auxiliary machine battery from the power supply is controlled by one or more electronic control units different from the first electronic control unit. Accordingly, even when the software of the first electronic control unit that controls the charging of the auxiliary machinery battery is rewritten, the auxiliary machinery battery can be charged by one or more electronic control units different from the first electronic control unit when the software is rewritten, and the power for rewriting the software of the first electronic control unit can be secured. This can ensure power to rewrite the software of the first electronic control unit.

7 Claims, 9 Drawing Sheets

ONBOARD SYSTEM

CROSS-REFERENCE TO RELATED APPLICATION

This application claims priority to Japanese Patent Application No. 2020-129764 filed on Jul. 30, 2020, incorporated herein by reference in its entirety.

BACKGROUND

1. Technical Field

The present disclosure relates to an onboard system that is mounted in a vehicle and more particularly to control of an onboard system including an electronic control unit that can rewrite software.

2. Description of Related Art

An onboard system which is mounted in a vehicle and which includes a high-voltage battery, an auxiliary-machinery battery, a charging device that charges the auxiliary-machinery battery with the high-voltage battery, and a plurality of electronic control units (hereinafter referred to as ECUs) that operate with electric power which is supplied from the auxiliary-machinery battery is known. An example thereof is described in Japanese Unexamined Patent Application Publication No. 2019-064424 (JP 2019-064424 A).

JP 2019-064424 A discloses an onboard system in which software of ECUs is rewritable and which includes a charging ECU that controls the charging device such that the auxiliary-machinery battery is charged with electric power from the high-voltage battery, a vehicle control ECU, and a rewritable control ECU that controls rewriting of software of the vehicle control ECU as a plurality of ECUs. JP 2019-064424 A describes that the auxiliary-machinery battery is charged with electric power from the high-voltage battery when a residual capacity of the auxiliary-machinery battery is less than a capacity threshold value in order to curb stopping of rewriting of software due to a decrease in residual capacity of the auxiliary-machinery battery at the time of rewriting of software of the vehicle control ECU.

SUMMARY

In the onboard system described in JP 2019-064424 A, there is a problem in which the auxiliary-machinery battery is not able to be charged at the time of rewriting of software and electric power for rewriting software cannot be secured when software of the charging ECU that controls charging of the auxiliary-machinery battery is being rewritten.

The present disclosure provides an onboard system that can secure electric power of an auxiliary-machinery battery even when software of an electronic control unit that controls charging of the auxiliary-machinery battery is being rewritten.

According to a first aspect of the present disclosure, there is provided (a) an onboard system that is mounted in a vehicle, (b) the onboard system including: a power supply; an auxiliary-machinery battery; a charging device that charges the auxiliary-machinery battery with electric power from the power supply; and a plurality of electronic control units that operates with electric power which is supplied from the auxiliary-machinery battery, (c) wherein a first electronic control unit configured to be able to rewrite software and to control the charging device such that charging of the auxiliary-machinery battery with the power supply is controlled is included as one of the plurality of electronic control units, and (d) wherein one or more electronic control units which are different from the first electronic control unit are configured to control charging of the auxiliary-machinery battery with the power supply when the software of the first electronic control unit is rewritten.

A second aspect of the present disclosure provides the onboard system according to the first aspect, (a) wherein the charging device includes a first charging device and a second charging device that are provided in parallel between the power supply and the auxiliary-machinery battery, (b) wherein the first electronic control unit is configured to control the first charging device such that the auxiliary-machinery battery is charged with the power supply, and (c) wherein one or more electronic control units which are different from the first electronic control unit are configured to control the second charging device such that the auxiliary-machinery battery is charged with the power supply.

A third aspect of the present disclosure provides the onboard system according to the second aspect, (a) wherein the second charging device is configured to be able to be additionally connected to an external power supply, and (b) wherein the one or more electronic control units which are different from the first electronic control unit are configured to control the second charging device such that the auxiliary-machinery battery is charged with the external power supply when the second charging device is connected to the external power supply at the time of rewriting of software of the first electronic control unit.

A fourth aspect of the present disclosure provides the onboard system according to the first or second aspect, wherein rewriting of software of the first electronic control unit is prohibited when a state of charge of the power supply is less than a threshold value which is set in advance at the time of rewriting of software of the first electronic control unit.

A fifth aspect of the present disclosure provides the onboard system according to the first aspect, (a) wherein the power supply includes a first power supply and a second power supply, (b) wherein the charging device includes a first charging device that charges the auxiliary-machinery battery with the first power supply and a second charging device that charges the auxiliary-machinery battery with the second power supply, (c) wherein the first electronic control unit is configured to control the first charging device such that the auxiliary-machinery battery is charged with the first power supply, and (d) wherein the one or more electronic control units which are different from the first electronic control unit are configured to control the second charging device such that the auxiliary-machinery battery is charged with the second power supply.

A sixth aspect of the present disclosure provides the onboard system according to the fifth aspect, wherein rewriting of software of the first electronic control unit is prohibited when a state of charge of the second power supply is less than a threshold value which is set in advance at the time of rewriting of software of the first electronic control unit.

A seventh aspect of the present disclosure provides the onboard system according to the fifth or sixth aspect, wherein the second power supply is a solar battery.

With the onboard system according to the first aspect, when software of the first electronic control unit is rewritten, one or more electronic control units which are different from the first electronic control unit control charging of the auxiliary-machinery battery with the power supply. Accordingly, even when software of the first electronic control unit that controls charging of the auxiliary-machinery battery is rewritten, charging of the auxiliary-machinery battery can be performed by the electronic control unit which is different from the first electronic control unit at the time of rewriting of software and thus it is possible to secure electric power for rewriting software of the first electronic control unit.

With the onboard system according to the second aspect, one or more electronic control units which are different from the first electronic control unit control the second charging device such that the auxiliary-machinery battery is charged with the power supply. Accordingly, when software of the first electronic control unit is rewritten, it is possible to secure electric power for rewriting the software of the first electronic control unit by causing one or more electronic control units which are different from the first electronic control unit to control the second charging device such that the auxiliary-machinery battery is charged with the power supply.

With the onboard system according to the third aspect, when the second charging device is connected to the external power supply at the time of rewriting of software of the first electronic control unit, the electronic control unit which is different from the first electronic control unit controls the second charging device such that the auxiliary-machinery battery is charged with the external power supply. Accordingly, even when the state of charge of the power supply is low at the time of rewriting of software of the first electronic control unit, the auxiliary-machinery battery can be charged with the external power supply and it is possible to secure electric power for rewriting software of the first electronic control unit.

With the onboard system according to the fourth aspect, when the state of charge of the power supply is less than the threshold value at the time of rewriting of software of the first electronic control unit, rewriting of software of the first electronic control unit is prohibited. Accordingly, it is possible to prevent a problem due to a decrease in the state of charge of the power supply with charging of the auxiliary-machinery battery.

With the onboard system according to the fifth aspect, an electronic control unit which is different from the first electronic control unit controls the second charging device such that the auxiliary-machinery battery is charged with the second power supply. Accordingly, when software of the first electronic control unit is rewritten, it is possible to secure electric power for rewriting software of the first electronic control unit by causing the second charging device to charge the auxiliary-machinery battery with the second power supply.

With the onboard system according to the sixth aspect, when the state of charge of the second power supply is less than the threshold value at the time of rewriting of software of the first electronic control unit, software of the first electronic control unit cannot be written and thus it is possible to prevent a problem due to a decrease in the state of charge of the second power supply with charging of the auxiliary-machinery battery.

With the onboard system according to the seventh aspect, the second power supply is a solar battery. Accordingly, when software of the first electronic control unit is rewritten, it is possible to secure electric power for rewriting software of the first electronic control unit by causing an electronic control unit which is different from the first electronic control unit to perform charging of the auxiliary-machinery battery with the solar battery.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the accompanying drawings. In the following embodiment, the drawings are appropriately simplified or modified, and dimensional ratios and shapes of constituents are not accurately the same as actual ones.

Figure 1:
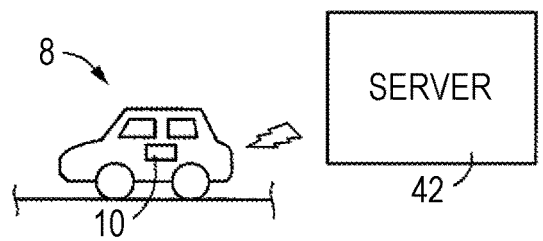
FIG. 1 is a diagram schematically illustrating a vehicle according to an embodiment of the present disclosure.

FIG. 1 is a diagram schematically illustrating a vehicle 8 according to an embodiment of the present disclosure. An onboard system 10 that performs travel control or the like is mounted in the vehicle 8. The onboard system 10 includes a plurality of electronic control units and is configured to transmit and receive data (information) to and from a server 42 which is an external device via a communication device 44 (see FIG. 2). The vehicle 8 is, for example, a hybrid vehicle using an engine, a first rotary machine MG1, and a second rotary machine MG2 which are not illustrated as drive force sources for traveling.

Figure 2:
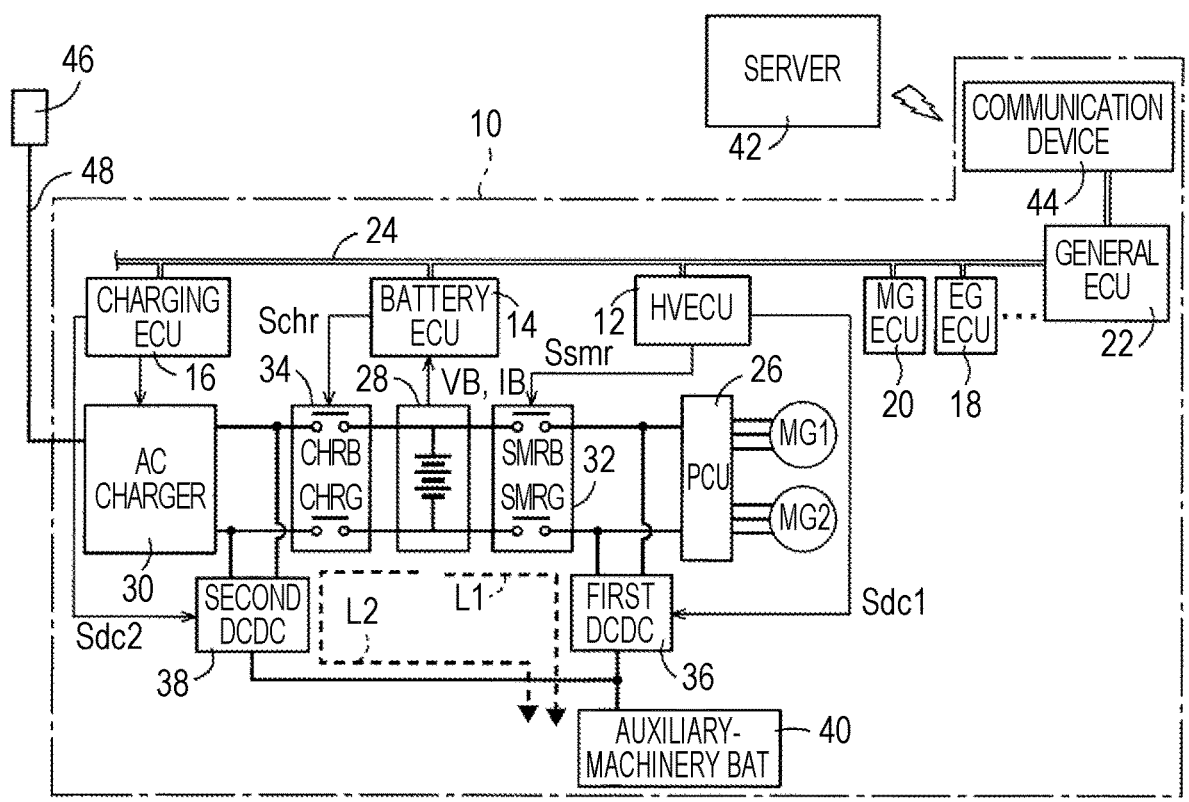
FIG. 2 is a diagram illustrating a configuration of an onboard system that is mounted in the vehicle according to the embodiment of the present disclosure.

FIG. 2 is a diagram illustrating a configuration of the onboard system 10 that is mounted in the vehicle 8. The onboard system 10 is configured to transmit and receive data (information) to and from the server 42 via the communication device 44 and has a function of rewriting software stored in the plurality of electronic control units constituting the onboard system 10 with new software from time to time. Software mentioned herein includes one or both of a control program stored in a ROM of an electronic control unit and data (such as a threshold value) used in the control program.

The onboard system 10 includes, for example, an HVECU 12, a battery ECU 14, a charging ECU 16, an EGECU 18, an MGECU 20, and a general ECU 22 which are the plurality of electronic control units that perform various types of control of the vehicle 8. Each of the ECUs includes a so-called microcomputer including a CPU, a RAM, a ROM, and input and output interfaces, and the CPU is configured to perform various types of control by performing signal processing in accordance with a program which is stored in the ROM in advance using a temporary storage function of the RAM. The ECUs are configured to communicate with each other, for example, via a multiplex communication line 24 such as a CAN. The ECUs operate with electric power which is supplied from an auxiliary-machinery battery 40 (an auxiliary-machinery BAT) illustrated in the drawing.

The onboard system 10 includes a power control unit 26 that controls the first rotary machine MG1 and the second rotary machine MG2, a high-voltage battery 28, an AC charger 30, a system main relay (SMR) 32, a charging relay 34, a first DCDC converter 36, a second DCDC converter 38, and the auxiliary-machinery battery 40. The high-voltage battery 28 corresponds to a power supply in the claims.

The power control unit 26 (the PCU 26) includes a step-up converter and an inverter and controls operation of the first rotary machine MG1 and the second rotary machine MG2 serving as drive force sources for traveling in accordance with an output instruction from the MGECU 20.

The high-voltage battery 28 is, for example, a rechargeable secondary battery such as a nickel-hydride secondary battery or a lithium-ion battery. The high-voltage battery 28 is supplied with electric power based on power generation control of the first rotary machine MG1 during travel or electric power based on regeneration control of the second rotary machine MG2. The vehicle 8 is configured to supply electric power from an external power supply 46 to the high-voltage battery 28, and electric power supplied from the external power supply 46 to the high-voltage battery 28 via the AC charger 30 or the like when the AC charger 30 is connected to the external power supply 46 via a charging cable 48. The AC charger 30 is configured to convert an alternating current supplied from the external power supply 46 to a direct current, to step up a voltage therefrom to a voltage matching the high-voltage battery 28, and to supply electric power to the high-voltage battery 28.

The high-voltage battery 28 is connected to the PCU 26 via the system main relay 32 (hereinafter referred to as an SMR 32) and is connected to the AC charger 30 via the charging relay 34 (hereinafter referred to as a CHR 34).

The SMR 32 is a relay that is provided between the high-voltage battery 28 and the PCU 26 and enables and cuts off supply of electric power of a high-voltage circuit between the high-voltage battery 28 and the PCU 26. The SMR 32 includes an SMRB (a plus side of the system main relay) and an SMRG (a minus side of the system main relay). When the SMR 32 is turned on, the SMRB and the SMRG are turned on such that electric power of the high-voltage battery 28 can be supplied to the PCU 26. When the SMR 32 is turned off, the SMRG and the SMRB are turned off such that supply of electric power between the high-voltage battery 28 and the PCU 26 is cut off. The turn-on/off state of SMR 32 is switched in accordance with an instruction signal Ssmr which is output from the HVECU 12.

The CHR 34 is a relay that is provided between the high-voltage battery 28 and the AC charger 30 and connects and disconnects the high-voltage battery 28 and the AC charger 30. The CHR 34 includes a CHRB (a plus side of the charging relay) and a CHRG (a minus side of the charging relay). When the CHR 34 is turned on, the CHRB and the CHRG are turned on such that electric power of the external power supply 46 which is supplied via the AC charger 30 can be supplied to the high-voltage battery 28. When the CHR 34 is turned off, the CHRG and the CHRB are turned off such that supply of electric power from the external power supply 46 is cut off. The turn-on/off state of the CHR 34 is switched in accordance with an instruction signal Schr which is output from the battery ECU 14.

The first DCDC converter 36 (hereinafter referred to as a first DCDC 36) serves as a charging device that steps down an output voltage of the high-voltage battery 28 and charges the auxiliary-machinery battery 40. The first DCDC 36 is connected to the high-voltage battery 28 via the SMR 26. The first DCDC 36 is driven based on an instruction signal Sdc1 which is output from the HVECU 12.

The second DCDC converter 38 (hereinafter referred to as a second DCDC 38) serves as a charging device that steps down an output voltage of the high-voltage battery 28 and charges the auxiliary-machinery battery 40 therewith. The second DCDC 38 is connected to the high-voltage battery 28 via the CHR 34. The second DCDC 38 is directly connected to the AC charger 30. The second DCDC 38 is driven based on an instruction signal Sdc2 which is output from the charging ECU 16.

The HVECU 12 is configured to calculate required amounts of output of the engine, the first rotary machine MG1, and the second rotary machine MG2 based on signals from various types of sensors which are provided in the vehicle 8 and to perform output control of a hybrid system such that the calculated required amounts of output are output. The HVECU 12 calculates a total output, for example, based on an output request from a driver which is calculated based on an accelerator operation amount eacc or a vehicle speed V and a state of charge SOC corresponding to a charging capacity (a residual capacity) of the high-voltage battery 28 and calculates required amounts of output for an engine driving force, an amount of electric charge generated by the first rotary machine MG1, and a driving force from the second rotary machine MG2 based on the total output. The HVECU 12 transmits the calculated required amount of output for the engine driving force to the EGECU 18 and transmits the required amount of output for the amount of electric power generated by the first rotary machine MG1 and the required amount of output for the driving force from the second rotary machine MG2 to the MGECU 20.

The EGECU 18 performs fuel injection control, ignition timing control, throttle control, and the like such that the required amount of output for the engine driving force transmitted from the HVECU 12 is output from the engine. The MGECU 20 controls the amount of electric power generated by the first rotary machine MG1 and the driving force from the second rotary machine MG2 based on the required amount of output for the amount of electric power generated by the first rotary machine MG1 and the required amount of output for the driving force from the second rotary machine MG2 which are transmitted from the HVECU 12.

For example, the HVECU 12 has a function of controlling the SMR 32 and the first DCDC 36 such that charging of the auxiliary-machinery battery 40 with the high-voltage battery 28 is controlled (auxiliary-machinery charging control) when the residual capacity of the auxiliary-machinery battery 40 becomes less than a predetermined value or the like and thus a charging request for the auxiliary-machinery battery 40 is issued. When auxiliary-machinery charging control for the auxiliary-machinery battery 40 is performed, the HVECU 12 outputs an instruction signal Ssmr for switching the SMR 32 to a connected state to the SMR 32 and outputs an instruction signal Sdc1 for driving the first DCDC 36 to the first DCDC 36. Accordingly, the high-voltage battery 28 and the first DCDC 36 are connected by switching the SMR 32 to the connected state, and the output voltage from the high-voltage battery 28 is stepped down and the auxiliary-machinery battery 40 is charged with electric power from the high-voltage battery 28 by further driving the first DCDC 36. The HVECU 12 corresponds to a first electronic control unit in the claims.

The battery ECU 14 has a function of switching the turn-on/off state of the CHR 34 which is provided between the high-voltage battery 28 and the AC charger 30. When the AC charger 30 is connected to the external power supply 46 via the charging cable 48, the charging ECU 16 controls the AC charger 30 such that an alternating current from the external power supply 46 is converted to a direct current and a voltage thereof is stepped up to a voltage matching the high-voltage battery 28. At this time, when the battery ECU 14 outputs an instruction signal Schr for turning on the CHR 34 to the CHR 34, the CHR 34 is switched to the turn-on state and the high-voltage battery 28 is charged with electric power stepped up and output by the AC charger 30.

The charging ECU 16 has a function of performing auxiliary-machinery charging control for controlling the AC charger 30 and driving the second DCDC 38 such that the output voltage from the AC charger 30 is stepped down and supplied to the auxiliary-machinery battery 40 when the AC charger 30 is connected to the external power supply 46 via the charging cable 48.

The general ECU 22 is connected to the ECUs via communication lines 24. For example, the general ECU 22 has a function of rewriting software stored in the ROM of the corresponding ECU with new software when the new software is received from the server 42 via the communication device 44. In this way, by transmitting new software from the server 42 via the communication device 44 from time to time, software stored in the ROM of each ECU of the onboard system 10 can be rewritten with new software without driving the vehicle to a dealer.

When software stored in the ROM of one of the ECUs of the onboard system 10 is updated, the server 42 transmits new software to the general ECU 22 via the communication device 44. The ROM of each ECU includes a nonvolatile memory having a rewritable storage area and is configured to enable the general ECU 22 to rewrite new software.

When it takes time to rewrite software due to constraints in an amount of data or constraints in communication of the vehicle at the time of rewriting software, it is necessary to secure a sufficient amount of electric power. When an amount of electric power of the auxiliary-machinery battery 40 that supplies electric power to the ECUs is insufficient at the time of rewriting software, there is concern of rewriting of software being stopped. In order to prevent rewriting of software from being stopped due to a shortage of electric power of the auxiliary-machinery battery 40, the onboard system 10 is configured to perform auxiliary-machinery charging control for controlling charging of the auxiliary-machinery battery 40 with the high-voltage battery 28 when software of one of the ECUs is rewritten.

For example, when software of an ECU which is different from the HVECU 12 is rewritten, the HVECU 12 is configured to perform auxiliary-machinery charging control for controlling the SMR 32 and the first DCDC 36 such that the auxiliary-machinery battery 40 is charged with the high-voltage battery 28. Specifically, when software other than that of the HVECU 12 is rewritten, the SMR 32 is switched to the turn-on state by the HVECU 12 and the first DCDC 36 is driven by the HVECU 12. Accordingly, since the auxiliary-machinery battery 40 is charged with the high-voltage battery 28 during rewriting of software of the ECU and electric power of the auxiliary-machinery battery 40 is secured, it is possible to prevent rewriting of software from being stopped due to a shortage of electric power of the auxiliary-machinery battery 40.

On the other hand, when software of the HVECU 12 is rewritten, it is difficult to perform auxiliary-machinery charging control of the HVECU 12. On the other hand, the onboard system 10 is configured to cause the electronic control units (the battery ECU 14 and the charging ECU 16) which are different from the HVECU 12 to control charging of the auxiliary-machinery battery 40 with the high-voltage battery 28 (auxiliary-machinery charging control) when software of the HVECU 12 is rewritten. Specifically, when software of the HVECU 12 is rewritten, auxiliary-machinery charging control for charging the auxiliary-machinery battery 40 with the high-voltage battery 28 is performed by causing the battery ECU 14 to control the CHR 34 such that the CHR 34 is switched to the turn-on state and causing the charging ECU 16 to control the second DCDC 38. As a result, when software of the HVECU 12 is rewritten, it is possible to secure electric power of the auxiliary-machinery battery 40 and to prevent rewriting of software from being stopped due to a shortage of electric power of the auxiliary-machinery battery 40 by performing auxiliary-machinery charging control for the auxiliary-machinery battery 40. In this embodiment, the battery ECU 14 and the charging ECU 16 correspond to one or more electronic control units which are different from the first electronic control unit in the claims.

As described above, in the onboard system 10, a charging path from the high-voltage battery 28 to the auxiliary-machinery battery 40 includes a first path L1 indicated by a dotted line including the SMR 32 and the first DCDC 36 and a second path L2 indicated by a dotted line including the CHR 34 and the second DCDC 38. The first path L1 and the second path L2 are provided in parallel between the high-voltage battery 28 and the auxiliary-machinery battery 40.

Accordingly, when software of the HVECU 12 that performs auxiliary-machinery charging control for the auxiliary-machinery battery 40 is rewritten, it is possible to secure electric power of the auxiliary-machinery battery 40 by performing the auxiliary-machinery charging control for the auxiliary-machinery battery 40 using the CHR 34 and the second DCDC 38 constituting the second path L2. As a result, rewriting of software is prevented from being stopped due to a shortage of electric power of the auxiliary-machinery battery 40 during rewriting of software. The SMR 32 and the first DCDC 36 constituting the first path L1 correspond to a charging device and a first charging device that charge the auxiliary-machinery battery with the power supply in the claims, and the CHR 34 and the second DCDC 38 constituting the second path L2 correspond to a charging device and a second charging device that charge the auxiliary-machinery battery with the power supply in the claims.

The second DCDC 38 is able to be connected to the external power supply 46 via the AC charger 30 and the charging cable 48. In consideration thereof, when the second DCDC 38 is connected to the external power supply 46 via the AC charger 30 and the charging cable 48 at the time of rewriting of software of the HVECU 12, the charging ECU 16 may control the second DCDC 38 such that the auxiliary-machinery battery 40 is charged with the external power supply 46. At this time, since the power supply for the auxiliary-machinery battery 40 is switched from the high-voltage battery 28 to the external power supply 46, the auxiliary-machinery battery 40 is stably supplied with electric power from the external power supply 46 regardless of the state of charge SOC of the high-voltage battery 28 and thus electric power of the auxiliary-machinery battery 40 can be appropriately secured. In this embodiment, the charging ECU 16 corresponds to one or more electronic control units which are different from the first electronic control unit, and the second DCDC 38 corresponds to a second charging device in the claims.

Figure 3:
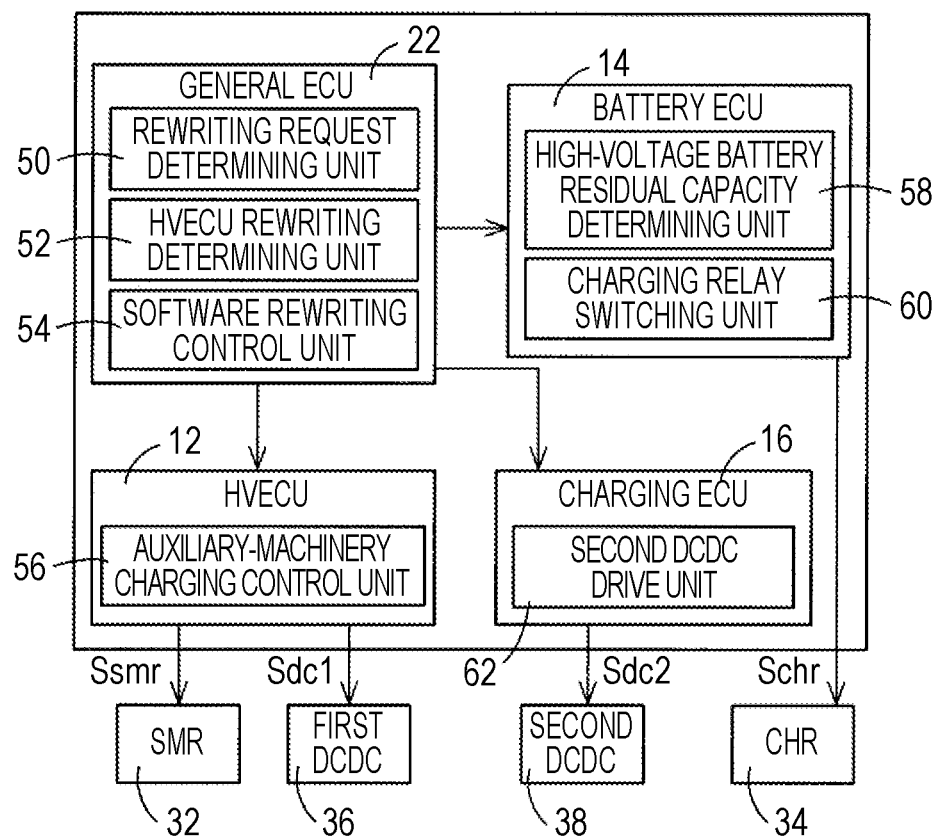
FIG. 3 is a functional block diagram illustrating control functions of ECUs which operate when software stored in a ROM of each ECU in the onboard system illustrated in FIG. 2 is rewritten.

FIG. 3 is a functional block diagram illustrating control functions of the ECUs which operate when software stored in the ROM of each ECU in the onboard system 10 is rewritten. Only the ECUs which operate when software is rewritten are illustrated in FIG. 3.

The general ECU 22 functionally includes a rewriting request determining unit 50 serving as a rewriting request determining means, an HVECU rewriting determining unit 52 serving as an HVECU rewriting determining means, and a software rewriting control unit 54 serving as a software rewriting control means.

The rewriting request determining unit 50 determines whether a request for rewriting software of one of the ECUs constituting the onboard system 10 has been issued. When software of one of the ECUs is transmitted from the server 42 via the communication device 44, the rewriting request determining unit 50 determines that a request for rewriting software has been issued.

When a request for rewriting software has been issued, the HVECU rewriting determining unit 52 determines whether the ECU of which software is to be rewritten is the HVECU 12.

When new software is received from the server 42 via the communication device 44, the software rewriting control unit 54 performs rewriting control for rewriting software stored in the ROM of the corresponding ECU with new software.

The HVECU 12 functionally includes an auxiliary-machinery charging control unit 56 serving as an auxiliary-machinery charging control means. When software of an ECU which is different from the HVECU 12 is rewritten, the auxiliary-machinery charging control unit 56 performs auxiliary-machinery charging control for stepping down the output voltage of the high-voltage battery 28 and charging the auxiliary-machinery battery 40 therewith by switching the SMR 32 to the turn-on state and additionally driving the first DCDC 36 before rewriting of software is started or at the same time as starting rewriting of software. Accordingly, since charging of the auxiliary-machinery battery 40 with the high-voltage battery 28 is performed when software of the ECU which is different from the HVECU 12 is being rewritten, it is possible to secure electric power for rewriting software of the auxiliary-machinery battery 40. As a result, it is possible to prevent rewriting of software from being stopped due to a shortage of electric power of the auxiliary-machinery battery 40 when software is being rewritten.

The battery ECU 14 functionally includes a high-voltage battery residual capacity determining unit 58 serving as a high-voltage battery residual determining means and a charging relay switching unit 60 serving as a charging relay switching means.

When a request for rewriting software of one of the ECUs has been issued, the high-voltage battery residual capacity determining unit 58 calculates a state of charge SOC (a charging capacity, a residual capacity) of the high-voltage battery 28 based on a voltage value VB and a current value IB of the high-voltage battery 28. The high-voltage battery residual capacity determining unit 58 determines whether the calculated state of charge SOC of the high-voltage battery 28 is equal to or greater than a threshold value SOC1 which is set in advance. The threshold value SOC1 is calculated and stored by experiment or design in advance and is set to a lower limit value of the state of charge SOC of the high-voltage battery 28 in which travel control of the vehicle 8 is not hindered even when auxiliary-machinery charging control for the auxiliary-machinery battery 40 using the high-voltage battery 28 is performed. Accordingly, the high-voltage battery residual capacity determining unit 58 serves as a control unit that determines whether auxiliary-machinery charging control for the auxiliary-machinery battery 40 can be performed based on the state of charge SOC of the high-voltage battery 28. The high-voltage battery residual capacity determining unit 58 permits rewriting of software when the state of charge SOC (the charging capacity, the residual capacity) of the high-voltage battery 28 is equal to or greater than the threshold value SOC1 at the time of rewriting of software of the ECU, and does not permit rewriting of software when the state of charge SOC of the high-voltage battery 28 is less than the threshold value SOC1. That is, when the state of charge SOC (the charging capacity, the residual capacity) of the high-voltage battery 28 is less than the threshold value SOC1 at the time of rewriting of software of the ECU, the software of the ECU cannot be rewritten.

The charging relay switching unit 60 switches the CHR 34 to the turn-on state when software of the HVECU 12 is rewritten. When the CHR 34 is switched to the turn-on state, the high-voltage battery 28 and the second DCDC 38 are connected.

The charging ECU 16 functionally includes a second DCDC drive unit 62 serving as a second DCDC drive unit. When the CHR 34 is switched to the turn-on state at the time of rewriting of software of the HVECU 12, the second DCDC drive unit 62 drives the second DCDC 38 to perform auxiliary-machinery charging control for stepping down the output voltage of the high-voltage battery 28 and charging the auxiliary-machinery battery 40. In this way, by causing the charging relay switching unit 60 to switch the CHR 34 to the turn-on state and causing the second DCDC drive unit 62 to drive the second DCDC 38 at the time of rewriting of software of the HVECU 12, the auxiliary-machinery battery 40 is charged with the high-voltage battery 28 during rewriting of software of the HVECU 12.

When it is determined that rewriting of software has been completed, the software rewriting control unit 54 outputs an instruction for stopping the auxiliary-machinery charging control for the auxiliary-machinery battery 40. For example, when rewriting of software of an ECU which is different from the HVECU 12 has been completed, the software rewriting control unit 54 outputs an instruction for stopping drive of the first DCDC 36 and switching the SMR 32 to the turn-off state to the auxiliary-machinery charging control unit 56. Accordingly, when the auxiliary-machinery charging control unit 56 switches the SMR 32 to the turn-off state and stops drive of the first DCDC 36, the auxiliary-machinery charging control for the auxiliary-machinery battery 40 is stopped.

When rewriting of software of the HVECU 12 has been completed, the software rewriting control unit 54 outputs an instruction for stopping drive of the second DCDC 38 to the second DCDC drive unit 62 and outputs an instruction for turning off the CHR 34 to the charging relay switching unit 60. Accordingly, when the second DCDC drive unit 62 stops drive of the second DCDC 38 and the charging relay switching unit 60 switches the CHR 34 to the turn-off state, the auxiliary-machinery charging control for the auxiliary-machinery battery 40 is stopped.

As described above, the auxiliary-machinery charging control unit 56 performs the auxiliary-machinery charging control for the auxiliary-machinery battery 40 when software of an ECU which is different from the HVECU 12 is rewritten, and the charging relay switching unit 60 and the second DCDC drive unit 62 perform the auxiliary-machinery charging control for the auxiliary-machinery battery 40 when software of the HVECU 12 is rewritten. Accordingly, it is possible to secure electric power of the auxiliary-machinery battery 40 even when software of any ECU is rewritten.

When the AC charger 30 is connected to the external power supply 46 via the charging cable 48, the auxiliary-machinery battery 40 can also be charged with electric power from the external power supply 46 via the AC charger 30 and the second DCDC 38 by causing the second DCDC drive unit 62 to drive the second DCDC 38.

Figure 4:
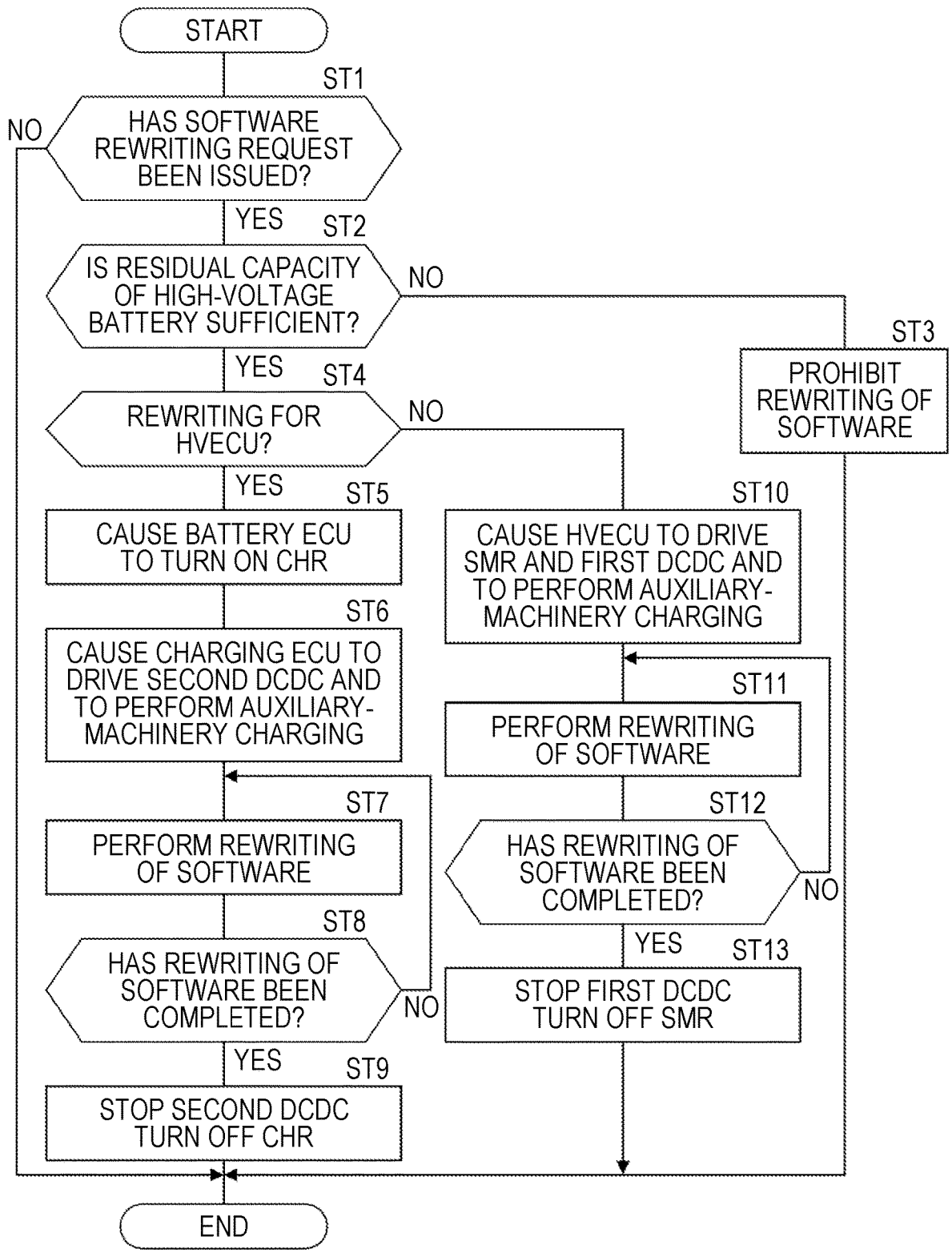
FIG. 4 is a flowchart illustrating a principal part of a control operation of the onboard system illustrated in FIG. 2, that is, a control operation that can secure electric power of an auxiliary-machinery battery and prevent stopping of rewriting of software due to a shortage of electric power when software in each ECU is being rewritten.

FIG. 4 is a flowchart illustrating a principal part of a control operation of the onboard system 10, that is, a control operation that can secure electric power of the auxiliary-machinery battery 40 when software in each ECU is being rewritten and prevent stopping of rewriting of software due to a shortage of electric power during rewriting of software. This flowchart is performed when the vehicle is stopped as well as when the vehicle is traveling.

First, in Step ST1 (the word "Step" is omitted below) corresponding to the control function of the rewriting request determining unit 50, it is determined whether a request for rewriting software of one of the ECUs has been issued from the server 42. When the determination result of ST1 is negative, this routine ends. When the determination result of ST1 is positive, the routine proceeds to ST2.

In ST2 corresponding to the control function of the high-voltage battery residual capacity determining unit 58, it is determined whether the state of charge SOC of the high-voltage battery 28 is equal to or greater than the threshold value SOC1. When the state of charge SOC of the high-voltage battery 28 is less than the threshold value SOC1, the determination result of ST2 is negative and rewriting of software is prohibited in ST3 corresponding to the control function of the high-voltage battery residual capacity determining unit 58. When the state of charge SOC of the high-voltage battery 28 is equal to or greater than the threshold value SOC1, the determination result of ST2 is positive and the routine proceeds to ST4.

In ST4 corresponding to the control function of the HVECU rewriting determining unit 52, it is determined whether an ECU of which software is to be rewritten is the HVECU 12. When the ECU of which software is to be rewritten is the HVECU 12, the determination result of ST4 is positive and the routine proceeds to ST5. On the other hand, when the ECU of which software is to be rewritten is an ECU which is different from the HVECU 12, the determination result of ST4 is negative and the routine proceeds to ST10.

Control of ST5 and steps subsequent thereto corresponding to the case in which the ECU of which software is to be rewritten is the HVECU 12 will be first described below. In ST5 corresponding to the control function of the charging relay switching unit 60, the CHR 34 is switched to the turn-on state. Subsequently, in ST6 corresponding to the control function of the second DCDC drive unit 62, the second DCDC 38 is driven and auxiliary-machinery charging control for stepping down the output voltage of the high-voltage battery 28 and charging the auxiliary-machinery battery 40 is performed.

In ST7 corresponding to the control function of the software rewriting control unit 54, new software is rewritten to the ROM of the HVECU 12. In ST8 corresponding to the control function of the software rewriting control unit 54, it is determined whether rewriting of software has been completed. When rewriting of software has not been completed, the determination result of ST8 is negative, the routine returns to ST7, and the rewriting of software continues to be performed. When rewriting of software has been completed, the determination result of ST8 is positive and the routine proceeds to ST9.

In ST9 corresponding to the control functions of the charging relay switching unit 60 and the second DCDC drive unit 62, drive of the second DCDC 38 is stopped and the CHR 34 is switched to the turn-off state, whereby the auxiliary-machinery charging control for the auxiliary-machinery battery 40 is stopped.

Control of ST10 or steps subsequent thereto corresponding to the case in which an ECU of which software is to be rewritten is an ECU which is different from the HVECU 12 will be described below. In ST10 corresponding to the control function of the auxiliary-machinery charging control unit 56, auxiliary-machinery charging control for stepping down the output voltage of the high-voltage battery 28 and charging the auxiliary-machinery battery 40 is performed by switching the SMR 32 to the turn-on state and driving the first DCDC 36.

In ST11 corresponding to the control function of the software rewriting control unit 54, new software is rewritten to the ROM of a predetermined ECU which is different from the HVECU 12. In ST12 corresponding to the control function of the software rewriting control unit 54, it is determined whether rewriting of software has been completed. When rewriting of software has not been completed, the determination result of ST12 is negative, the routine returns to ST11, and the rewriting of software continues to be performed. When rewriting of software has been completed, the determination result of ST12 is positive and the routine proceeds to ST13.

In ST13 corresponding to the control function of the auxiliary-machinery charging control unit 56, drive of the first DCDC 36 is stopped and the SMR 32 is switched to the turn-off state, whereby the auxiliary-machinery charging control for the auxiliary-machinery battery 40 is stopped.

In this way, electric power of the auxiliary-machinery battery 40 is secured by performing auxiliary-machinery charging control using the HVECU 12 when software of an ECU which is different from the HVECU 12 is being rewritten, and electric power of the auxiliary-machinery battery 40 is secured by performing auxiliary-machinery charging control using the battery ECU 14 and the charging ECU 16 when software of the HVECU 12 is being rewritten. Accordingly, since electric power of the auxiliary-machinery battery 40 is secured even when software of any ECU is rewritten, it is possible to prevent rewriting of software from being stopped due to a shortage of electric power of the auxiliary-machinery battery 40.

As described above, according to this embodiment, when software of the HVECU 12 is rewritten, the battery ECU 14 and the charging ECU 16 control charging of the auxiliary-machinery battery 40 with the high-voltage battery 28. Accordingly, even when software of the HVECU 12 that controls charging of the auxiliary-machinery battery 40 is rewritten, charging of the auxiliary-machinery battery 40 can be performed at the time of rewriting of software by the battery ECU 14 and the charging ECU 16 which are different from the HVECU 12 and thus it is possible to secure electric power for rewriting software of the HVECU 12.

According to this embodiment, the battery ECU 14 and the charging ECU 16 control the CHR 34 and the second DCDC 38 such that the auxiliary-machinery battery 40 is charged with the high-voltage battery 28. Accordingly, when software of the HVECU 12 is rewritten, it is possible to secure electric power for rewriting the software of the HVECU 12 by causing the battery ECU 14 and the charging ECU 16 to control the CHR 34 and the second DCDC 38 such that the auxiliary-machinery battery 40 is charged with the high-voltage battery 28.

According to this embodiment, when the second DCDC 38 is connected to the external power supply 46 at the time of rewriting of software of the HVECU 12, the charging ECU 16 controls the second DCDC 38 such that the auxiliary-machinery battery 40 is charged with the external power supply 46. Accordingly, even when the state of charge (the residual capacity) of the high-voltage battery 28 is low at the time of rewriting of software of the HVECU 12, the auxiliary-machinery battery 40 can be charged with the external power supply 46 and it is possible to secure electric power for rewriting software of the HVECU 12.

According to this embodiment, when the state of charge SOC of the high-voltage battery 28 is less than the threshold value SOC1 at the time of rewriting of software of the HVECU 12, rewriting of software of the HVECU 12 is prohibited. Accordingly, it is possible to prevent a problem that travel control of the vehicle 8 is hindered due to a decrease in the state of charge SOC (the charging capacity, the residual capacity) of the high-voltage battery 28 with charging of the auxiliary-machinery battery 40.

Another embodiment of the present disclosure will be described below. In the following description, the same elements as in the aforementioned embodiment will be referred to by the same reference signs and description thereof will be omitted.

Figure 5:
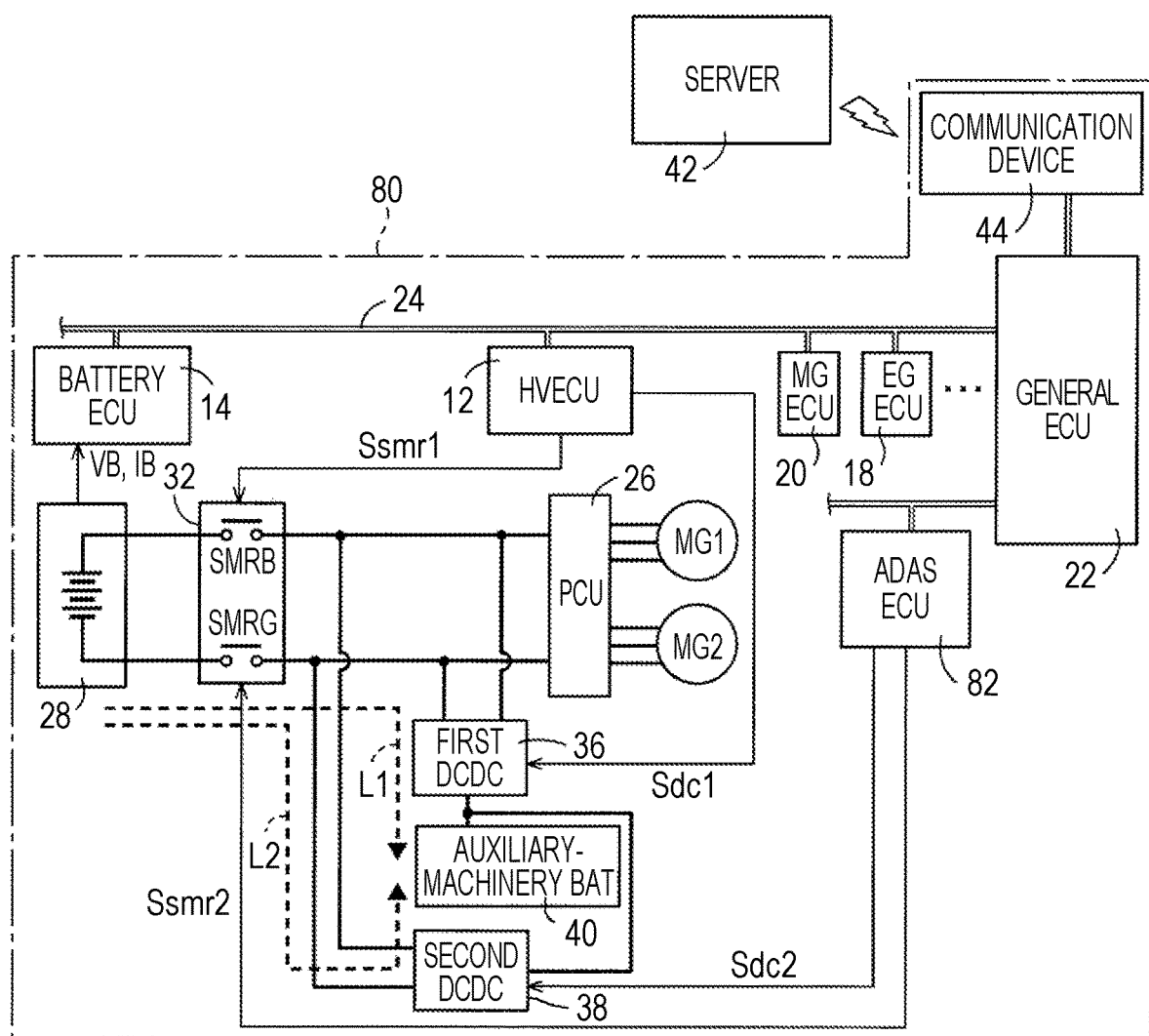
FIG. 5 is a diagram illustrating a configuration of an onboard system that is mounted in a vehicle according to another embodiment of the present disclosure.

FIG. 5 is a diagram illustrating a configuration of an onboard system 80 that is mounted in a vehicle according to another embodiment of the present disclosure. The onboard system 80 according to this embodiment is mounted in a vehicle including an automated driving system. A basic structure of a drive system of the vehicle is the same as in the vehicle 8 according to the first embodiment and thus description thereof will be omitted. A configuration different from that of the onboard system 10 according to the first embodiment will be mainly described below.

The onboard system 80 includes an ADASECU 82 that performs various types of control during automated driving. The ADASECU 82 has a function of ascertaining information near the vehicle from information from various sensors or cameras attached to the vehicle or information transmitted from the server 42 and performs automated driving control for controlling the vehicle instead of a driver based on the information or supporting a driver's driving. Specific control of automated driving by the ADASECU 82 will be omitted.

In this embodiment, the second DCDC 38 is provided between the SMR 32 and the auxiliary-machinery battery 40. Accordingly, when the SMR 32 is switched to the turn-on state, the high-voltage battery 28 and the second DCDC 38 are connected and auxiliary-machinery charging control for stepping down the output voltage of the high-voltage battery 28 and charging the auxiliary-machinery battery 40 can be performed. The second DCDC 38 is driven based on an instruction signal Sdc2 output from the ADASECU 82. That is, in the onboard system 80, the ADASECU 82 has a function of performing auxiliary-machinery charging control for charging the auxiliary-machinery battery 40 with electric power of the high-voltage battery 28 by driving the second DCDC 38.

In the onboard system 80, a charging path from the high-voltage battery 28 to the auxiliary-machinery battery 40 includes a first path L1 including the SMR 32 and the first DCDC 36 and a second path L2 including the SMR 32 and the second DCDC 38. The first DCDC 36 and the second DCDC 38 are provided in parallel between the SMR 32 and the auxiliary-machinery battery 40. The SMR 32 and the first DCDC 36 in the first path L1 correspond to a charging device and a first charging device in the claims, and the SMR 32 and the second DCDC 38 in the second path L2 correspond to a charging device and a second charging device in the claims.

In the onboard system 80, when software of an ECU which is different from the HVECU 12 is rewritten, auxiliary-machinery charging control for charging the auxiliary-machinery battery 40 with electric power from the high-voltage battery 28 is performed by switching the SMR 32 to the turn-on state and driving the first DCDC 36 based on instruction signals Ssmr1 and Sdc1 from the HVECU 12. When software of the HVECU 12 is rewritten, auxiliary-machinery charging control for charging the auxiliary-machinery battery 40 with electric power from the high-voltage battery 28 is performed by switching the SMR 32 to the turn-on state and driving the second DCDC 38 based on instruction signals Ssmr2 and Sdc2 from the ADASECU 82.

Accordingly, auxiliary-machinery charging control for charging the auxiliary-machinery battery 40 with electric power from the high-voltage battery 28 is performed by the HVECU 12 when software of an ECU which is different from the HVECU 12 is rewritten, and auxiliary-machinery charging control for charging the auxiliary-machinery battery 40 with electric power from the high-voltage battery 28 is performed by the ADASECU 82 when software of the HVECU 12 is rewritten. As a result, when software of the HVECU 12 is rewritten, it is possible to secure electric power of the auxiliary-machinery battery 40 and to prevent rewriting of software from being stopped due to a shortage of electric power of the auxiliary-machinery battery 40 by causing the ADASECU 82 to perform auxiliary-machinery charging control for charging the auxiliary-machinery battery 40. In this embodiment, the HVECU 12 corresponds to a first electronic control unit in the claims, and the ADASECU 82 corresponds to one or more electronic control units which are different from the first electronic control unit in the claims.

Figure 6:
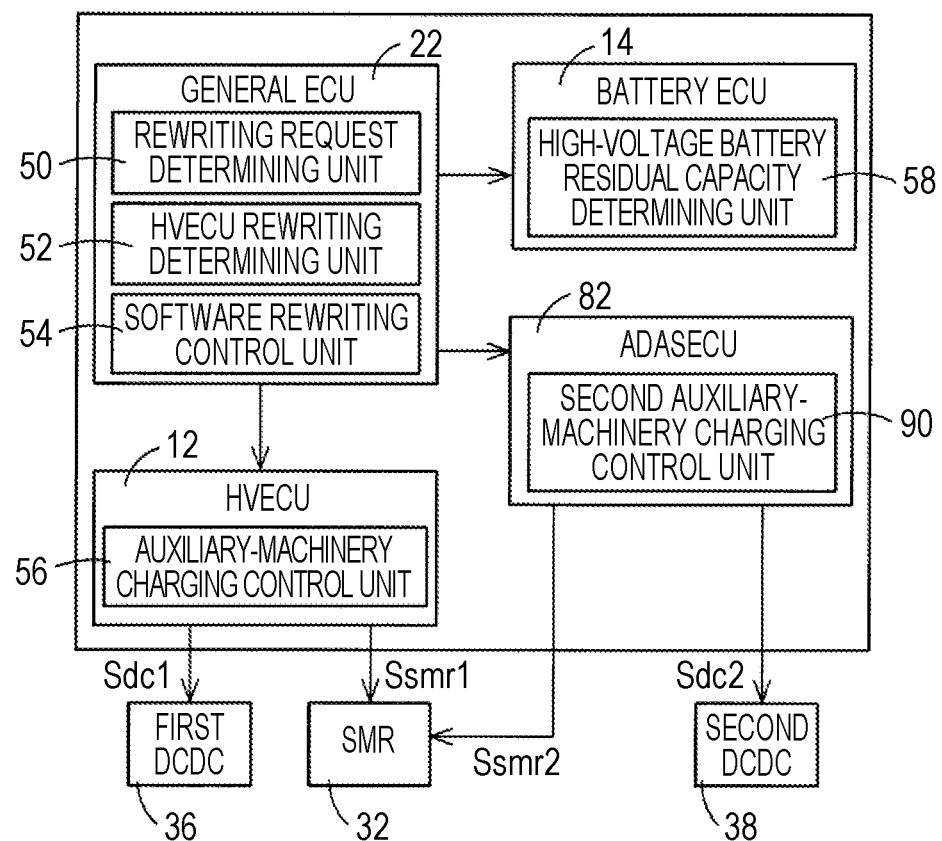
FIG. 6 is a functional block diagram illustrating control functions of ECUs which operate when software stored in a ROM of each ECU in the onboard system illustrated in FIG. 5 is rewritten.

FIG. 6 is a functional block diagram illustrating control functions of ECUs which operate when software stored in a ROM of each ECU in the onboard system 80 is rewritten. In FIG. 6, only the control functions different from those in the aforementioned embodiment will be described below.

The ADASECU 82 functionally includes a second auxiliary-machinery charging control unit 90 serving as a second auxiliary-machinery charging control means.

The second auxiliary-machinery charging control unit 90 performs auxiliary-machinery charging control for charging the auxiliary-machinery battery 40 with electric power from the high-voltage battery 28 by switching the SMR 32 to the turn-on state and then controlling the second DCDC 38 when software of the HVECU 12 is rewritten. Accordingly, since auxiliary-machinery charging control for the auxiliary-machinery battery 40 is performed during rewriting of software of the HVECU 12, it is possible to secure electric power of the auxiliary-machinery battery 40.

Figure 7:
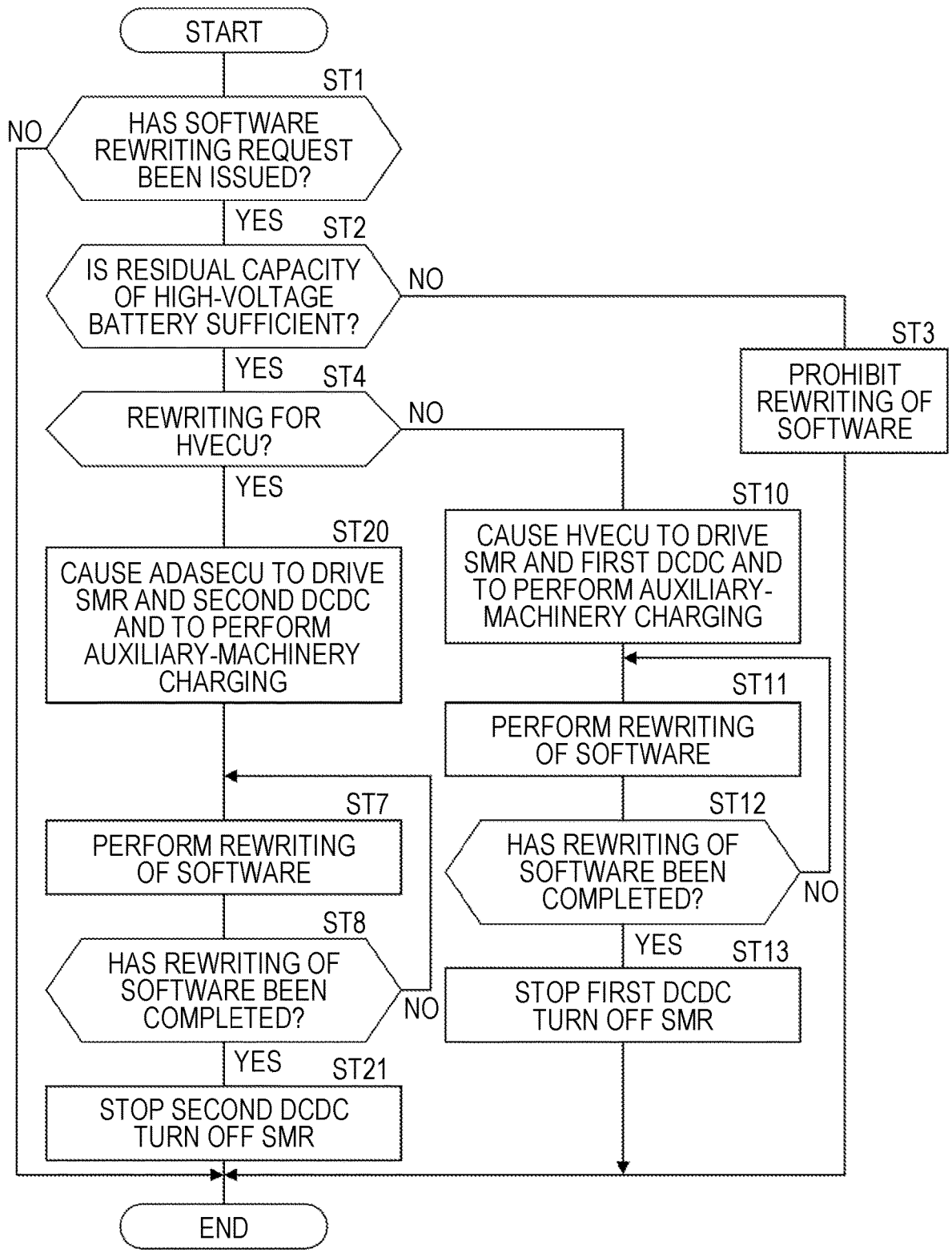
FIG. 7 is a flowchart illustrating a principal part of a control operation of the onboard system illustrated in FIG. 5, that is, a control operation that can secure electric power of an auxiliary-machinery battery and prevent stopping of rewriting of software due to a shortage of electric power when software in each ECU is being rewritten.

FIG. 7 is a flowchart illustrating a principal part of a control operation of the onboard system 80, that is, a control operation that can secure electric power of the auxiliary-machinery battery 40 when software in each ECU is being rewritten and prevent stopping of rewriting of software due to a shortage of electric power during rewriting of software. This flowchart is performed when the vehicle is stopped as well as when the vehicle is traveling.

First, in Step ST1 (the word "Step" is omitted below) corresponding to the control function of the rewriting request determining unit 50, it is determined whether a request for rewriting software of one of the ECUs has been issued from the server 42. When the determination result of ST1 is negative, this routine ends. When the determination result of ST1 is positive, the routine proceeds to ST2.

In ST2 corresponding to the control function of the high-voltage battery residual capacity determining unit 58, it is determined whether the state of charge SOC of the high-voltage battery 28 is equal to or greater than the threshold value SOC1. When the state of charge SOC of the high-voltage battery 28 is less than the threshold value SOC1, the determination result of ST2 is negative and rewriting of software is prohibited in ST3 corresponding to the control function of the high-voltage battery residual capacity determining unit 58. When the state of charge SOC of the high-voltage battery 28 is equal to or greater than the threshold value SOC1, the determination result of ST2 is positive and the routine proceeds to ST4.

In ST4 corresponding to the control function of the HVECU rewriting determining unit 52, it is determined whether an ECU of which software is to be rewritten is the HVECU 12. When the ECU of which software is to be rewritten is the HVECU 12, the determination result of ST4 is positive and the routine proceeds to ST20. On the other hand, when the ECU of which software is to be rewritten is an ECU which is different from the HVECU 12, the determination result of ST4 is negative and the routine proceeds to ST10.

Control of ST20 and steps subsequent thereto corresponding to the case in which the ECU of which software is to be rewritten is the HVECU 12 will be first described below. In ST20 corresponding to the control function of the second auxiliary-machinery charging control unit 90, the SMR 32 is switched to the turn-on state, the second DCDC 38 is driven, and auxiliary-machinery charging control for stepping down the output voltage of the high-voltage battery 28 and charging the auxiliary-machinery battery 40 is performed.

In ST7 corresponding to the control function of the software rewriting control unit 54, new software is rewritten to the ROM of the HVECU 12. In ST8 corresponding to the control function of the software rewriting control unit 54, it is determined whether rewriting of software has been completed. When rewriting of software has not been completed, the determination result of ST8 is negative, the routine returns to ST7, and the rewriting of software continues to be performed. When rewriting of software has been completed, the determination result of ST8 is positive and the routine proceeds to ST21.

In ST21 corresponding to the control function of the second auxiliary-machinery charging control unit 90, drive of the second DCDC 38 is stopped and the SMR 32 is switched to the turn-off state, whereby the auxiliary-machinery charging control for the auxiliary-machinery battery 40 is stopped.

Control of ST10 or steps subsequent thereto corresponding to the case in which an ECU of which software is to be rewritten is an ECU which is different from the HVECU 12 will be described below. In ST10 corresponding to the control function of the auxiliary-machinery charging control unit 56, auxiliary-machinery charging control for stepping down the output voltage of the high-voltage battery 28 and charging the auxiliary-machinery battery 40 is performed by switching the SMR 32 to the turn-on state and driving the first DCDC 36.

In ST11 corresponding to the control function of the software rewriting control unit 54, new software is rewritten to the ROM of a predetermined ECU which is different from the HVECU 12. In ST12 corresponding to the control function of the software rewriting control unit 54, it is determined whether rewriting of software has been completed. When rewriting of software has not been completed, the determination result of ST12 is negative, the routine returns to ST11, and the rewriting of software continues to be performed. When rewriting of software has been completed, the determination result of ST12 is positive and the routine proceeds to ST13.

In ST13 corresponding to the control function of the auxiliary-machinery charging control unit 56, drive of the first DCDC 36 is stopped and the SMR 32 is switched to the turn-off state, whereby the auxiliary-machinery charging control for the auxiliary-machinery battery 40 is stopped.

In this way, electric power of the high-voltage battery 28 is supplied to the auxiliary-machinery battery 40 by performing auxiliary-machinery charging control using the HVECU 12 when software of an ECU which is different from the HVECU 12 is being rewritten, and electric power of the high-voltage battery 28 is supplied to the auxiliary-machinery battery 40 by performing auxiliary-machinery charging control using the ADASECU 82 when software of the HVECU 12 is being rewritten. Accordingly, even when software of any ECU is rewritten, electric power is supplied to the auxiliary-machinery battery 40 and thus electric power of the auxiliary-machinery battery 40 is secured even during rewriting of software. As a result, it is possible to prevent rewriting of software from being stopped due to a shortage of electric power of the auxiliary-machinery battery 40 during rewriting of software.

As described above, according to this embodiment, when software of the HVECU 12 is rewritten, the ADASECU 82 controls charging of the auxiliary-machinery battery 40 with the high-voltage battery 28. Accordingly, even when software of the HVECU 12 that controls charging of the auxiliary-machinery battery 40 is rewritten, charging of the auxiliary-machinery battery 40 can be performed at the time of rewriting of software by the ADASECU 82 and thus it is possible to secure electric power for rewriting software of the HVECU 12. In this way, according to this embodiment, the same advantages as in the first embodiment can be achieved.

Figure 8:
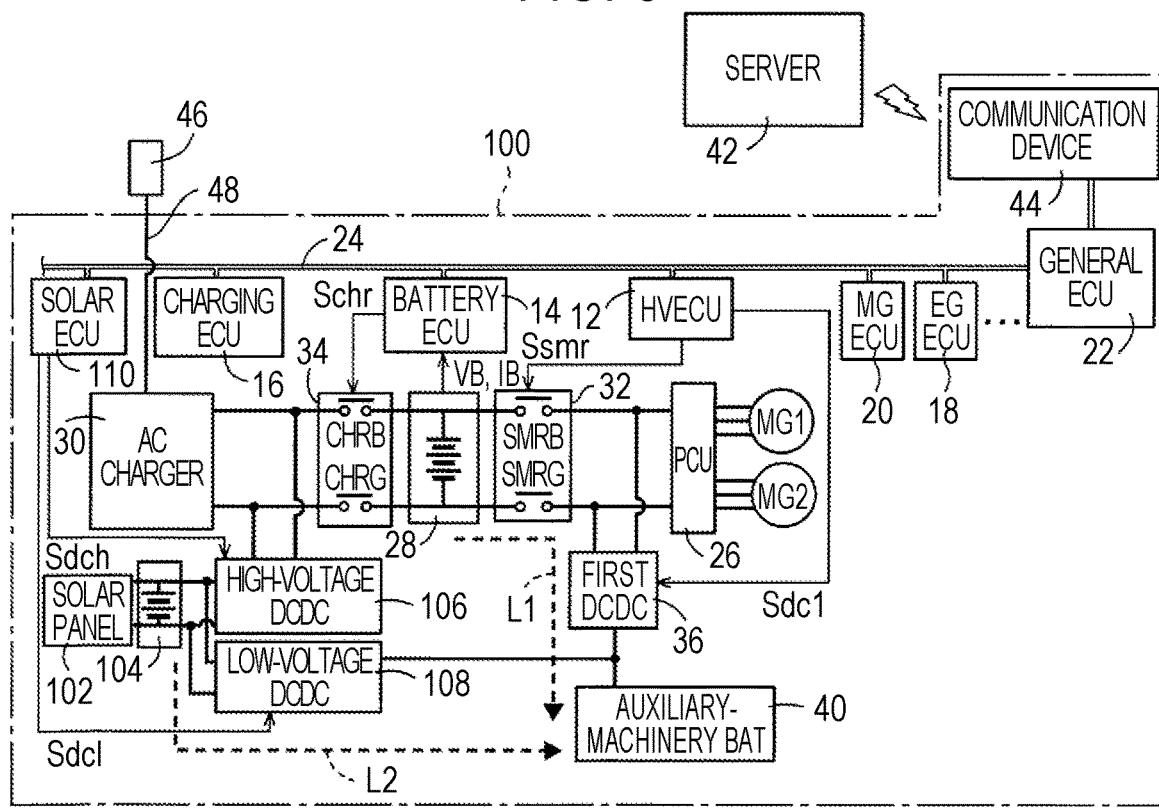
FIG. 8 is a diagram illustrating a configuration of an onboard system that is mounted in a vehicle according to another embodiment of the present disclosure.

FIG. 8 is a diagram illustrating a configuration of an onboard system 100 that is mounted in a vehicle according to another embodiment of the present disclosure. The onboard system 100 according to this embodiment is mounted in a vehicle including a system that can perform solar charging. A basic structure of a drive system of the vehicle is the same as in the vehicle 8 according to the first embodiment and thus description thereof will be omitted. A configuration different from that of the onboard system 10 according to the first embodiment will be mainly described below.

The onboard system 100 includes a solar panel 102, a solar battery 104 that is charged with electric power generated by the solar panel 102, a high-voltage DCDC converter 106 (hereinafter referred to as a high-voltage DCDC 106) that steps up an output voltage of the solar battery 104 and charges the high-voltage battery 28, and a low-voltage DCDC converter 108 (hereinafter referred to as a low-voltage DCDC 108) that steps down the output voltage of the solar battery 104 and charges the auxiliary-machinery battery 40. The onboard system 100 includes a solar ECU 110 that controls operations of the high-voltage DCDC 106 and the low-voltage DCDC 108. In this embodiment, a power supply includes the high-voltage battery 28 and the solar battery 104. In this embodiment, the high-voltage battery 28 corresponds to a first power supply in the claims, and the solar battery 104 corresponds to a second power supply in the claims.

The high-voltage DCDC 106 is connected to the solar battery 104 and is a step-up converter that steps up the output voltage of the solar battery 104 and charges the high-voltage battery 28. The low-voltage DCDC 108 is connected to the solar battery 104 and is a step-down converter that steps down output power of the solar battery 104 and charges the auxiliary-machinery battery 40 therewith. The high-voltage DCDC 106 and the low-voltage DCDC 108 are driven in accordance with instruction signals Sdch and Sdc1 which are output from the solar ECU 110.

The solar ECU 110 has a function of supply electric power charged in the solar battery 104 to the high-voltage battery 28 by driving the high-voltage DCDC 106. The solar ECU 110 also has a function of supplying electric power charged in the solar battery 104 to the auxiliary-machinery battery 40 by driving the low-voltage DCDC 108. In this embodiment, the HVECU 12 corresponds to a first electronic control unit in the claims, and the solar ECU 110 corresponds to an electronic control unit which is different from the first electronic control unit in the claims.

In the onboard system 100, a charging path to the auxiliary-machinery battery 40 includes a first path L1 including the SMR 32 and the first DCDC 36 and a second path L2 including the low-voltage DCDC 108. In this embodiment, the SMR 32 and the first DCDC 36 in the first path L1 correspond to a first charging device that charges the auxiliary-machinery battery with the first power supply in the claims, and the low-voltage DCDC 108 in the second path L2 corresponds to a second charging device that charges the auxiliary-machinery battery with the second power supply in the claims.

In the onboard system 100, when software of an ECU which is different from the HVECU 12 is rewritten, auxiliary-machinery charging control for charging the auxiliary-machinery battery 40 with electric power from the high-voltage battery 28 is performed by switching the SMR 32 to the turn-on state and driving the first DCDC 36 based on instruction signals Ssmr and Sdc1 from the HVECU 12. When software of the HVECU 12 is rewritten, auxiliary-machinery charging control for charging the auxiliary-machinery battery 40 with electric power from the solar battery 104 is performed by driving the low-voltage DCDC 108 based on an instruction signal Sdc1 from the solar ECU 110.

Accordingly, auxiliary-machinery charging control for charging the auxiliary-machinery battery 40 based on an instruction from the HVECU 12 is performed when software of an ECU which is different from the HVECU 12 is being rewritten, and auxiliary-machinery charging control for charging the auxiliary-machinery battery 40 based on an instruction from the solar ECU 110 is performed when software of the HVECU 12 is rewritten. As a result, even when software of the HVECU 12 that performs auxiliary-machinery charging control for the auxiliary-machinery battery 40 is being rewritten, it is possible to secure electric power of the auxiliary-machinery battery 40 and to prevent rewriting of software from being stopped due to a shortage of electric power of the auxiliary-machinery battery 40.

Figure 9:
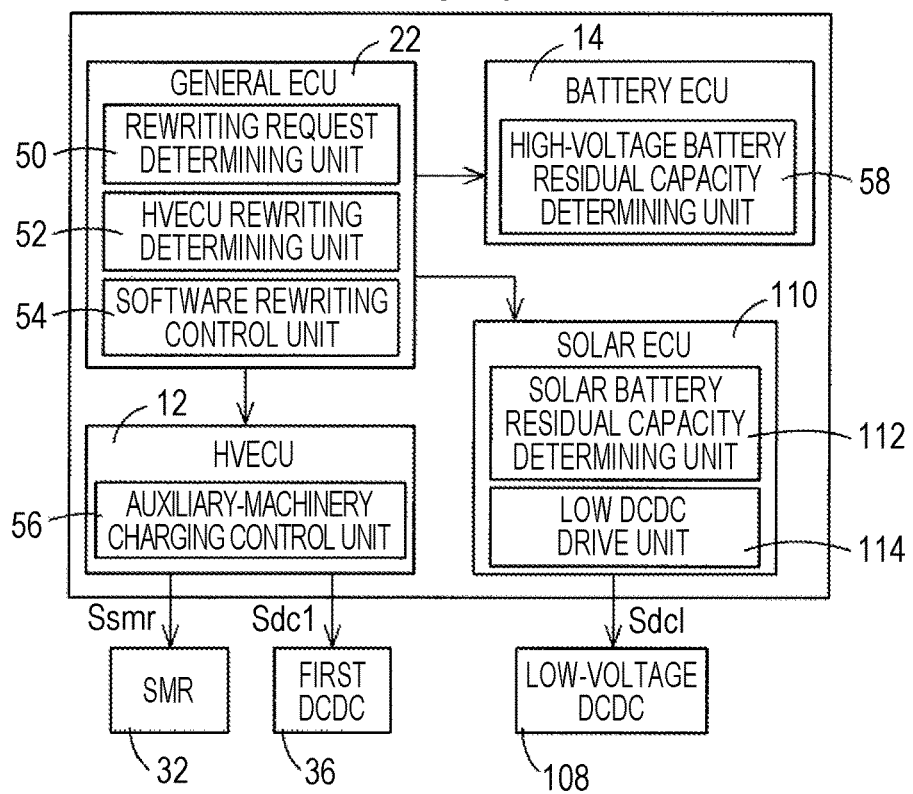
FIG. 9 is a functional block diagram illustrating control functions of ECUs which operate when software stored in a ROM of each ECU in the onboard system illustrated in FIG. 8 is rewritten.

FIG. 9 is a functional block diagram illustrating control functions of ECUs which operate when software stored in a ROM of each ECU in the onboard system 100 is rewritten. In FIG. 9, only the control functions different from those in the aforementioned embodiment will be described below.

The solar ECU 110 functionally includes a solar battery residual capacity determining unit 112 serving as a solar battery residual capacity determining means and a low-voltage DCDC drive unit 114 serving as a low-voltage DCDC drive means.

When software of the HVECU 12 is rewritten, the solar battery residual capacity determining unit 112 determines whether a state of charge SOCs (a residual capacity) of the solar battery 104 is equal to or greater than a threshold value SOCs1 which is set in advance. The threshold value SOCs1 is calculated and stored by experiment or design in advance and is set to a lower limit value of the state of charge SOCs (the charging capacity, the residual capacity) of the solar battery 104 in which travel control of the vehicle is not hindered even when auxiliary-machinery charging control for the auxiliary-machinery battery 40 using the solar battery 104 is performed. That is, the solar battery residual capacity determining unit 112 serves as a control unit that determines whether auxiliary-machinery charging control for the auxiliary-machinery battery 40 with the solar battery 104 can be performed during rewriting of software of the HVECU 12 based on the state of charge SOCs of the solar battery 104. The solar battery residual capacity determining unit 112 permits rewriting of software of the HVECU 12 when the state of charge SOCs of the solar battery 104 is equal to or greater than the threshold value SOCs1, and does not permit rewriting of software of the HVECU 12 when the state of charge SOCs of the solar battery 104 is less than the threshold value SOCs1. That is, when the state of charge SOCs (the charging capacity, the residual capacity) of the solar battery 104 is less than the threshold value SOCs1 at the time of rewriting of software of the HVECU 12, the software of the HVECU 12 cannot be rewritten.

When it is determined that software of the HVECU 12 is to be rewritten, the low-voltage DCDC drive unit 114 drives the low-voltage DCDC 108 and performs auxiliary-machinery charging control for stepping down the output voltage of the solar battery 104 and charging the auxiliary-machinery battery 40. Accordingly, since auxiliary-machinery charging control for the auxiliary-machinery battery 40 is performed during rewriting of software of the HVECU 12, it is possible to secure electric power of the auxiliary-machinery battery 40.

Figure 10:
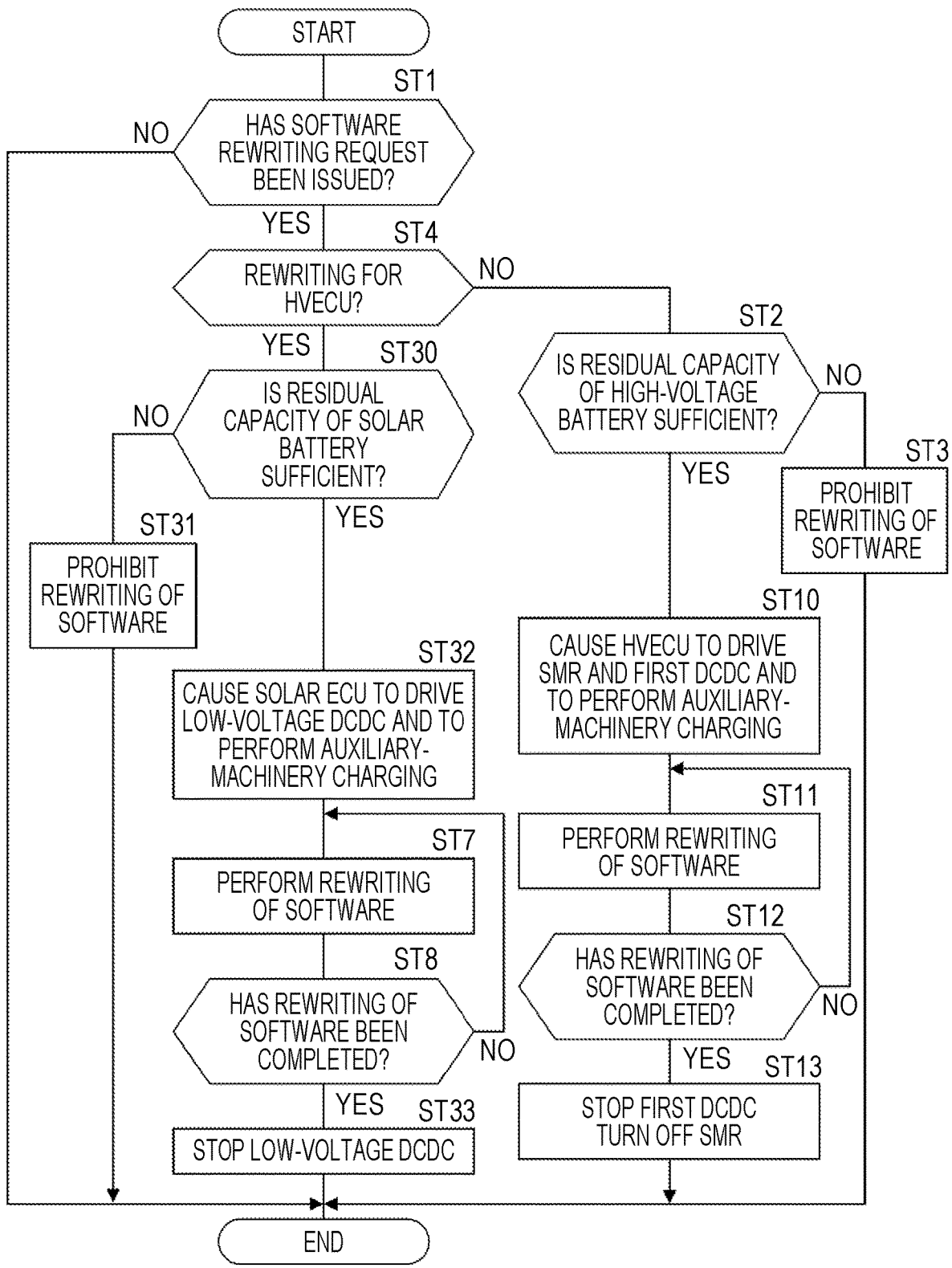
FIG. 10 is a flowchart illustrating a principal part of a control operation of the onboard system illustrated in FIG. 8, that is, a control operation that can secure electric power of an auxiliary-machinery battery and prevent stopping of rewriting of software due to a shortage of electric power when software in each ECU is being rewritten.

FIG. 10 is a flowchart illustrating a principal part of a control operation of the onboard system 100, that is, a control operation that can secure electric power of the auxiliary-machinery battery 40 when software in each ECU is being rewritten and prevent stopping of rewriting of software due to a shortage of electric power during rewriting of software. This flowchart is performed when the vehicle is stopped as well as when the vehicle is traveling.

First, in Step ST1 (the word "Step" is omitted below) corresponding to the control function of the rewriting request determining unit 50, it is determined whether a request for rewriting software of one of the ECUs has been issued from the server 42. When the determination result of ST1 is negative, this routine ends. When the determination result of ST1 is positive, the routine proceeds to ST4.

In ST4 corresponding to the control function of the HVECU rewriting determining unit 52, it is determined whether an ECU of which software is to be rewritten is the HVECU 12. When the ECU of which software is to be rewritten is the HVECU 12, the determination result of ST4 is positive and the routine proceeds to ST30. On the other hand, when the ECU of which software is to be rewritten is an ECU which is different from the HVECU 12, the determination result of ST4 is negative and the routine proceeds to ST2.

Control of ST30 and steps subsequent thereto corresponding to the case in which the ECU of which software is to be rewritten is the HVECU 12 will be first described below. In ST30 corresponding to the control function of the solar battery residual capacity determining unit 112, it is determined whether the state of charge SOCs of the solar battery 104 is equal to or greater than the threshold value SOCs1. When the state of charge SOCs of the solar battery 104 is less than the threshold value SOCs1, the determination result of ST30 is negative and rewriting of software of the HVECU 12 is not permitted in ST31 corresponding to the control function of the solar battery residual capacity determining unit 112.

When the state of charge SOCs of the solar battery 104 is equal to or greater than the threshold value SOCs1, the determination result of ST30 is positive and the routine proceeds to ST32. In ST32 corresponding to the control function of the low-voltage DCDC drive unit 114, the low-voltage DCDC 108 is driven and the output voltage of the solar battery 104 is stepped down and charged in the auxiliary-machinery battery 40.

In ST7 corresponding to the control function of the software rewriting control unit 54, new software is rewritten to the ROM of the HVECU 12. In ST8 corresponding to the control function of the software rewriting control unit 54, it is determined whether rewriting of software has been completed. When rewriting of software has not been completed, the determination result of ST8 is negative, the routine returns to ST7, and the rewriting of software continues to be performed. When rewriting of software has been completed, the determination result of ST8 is positive and the routine proceeds to ST33.

In ST33 corresponding to the control function of the low-voltage DCDC drive unit 114, drive of the low-voltage DCDC 108 is stopped and auxiliary-machinery charging control for the auxiliary-machinery battery 40 is stopped with completion of rewriting of software of the HVECU 12.

Control of ST2 or steps subsequent thereto corresponding to the case in which the ECU of which software is to be rewritten is an ECU which is different from the HVECU 12 will be described below.

In ST2 corresponding to the control function of the high-voltage battery residual capacity determining unit 58, it is determined whether the state of charge SOC of the high-voltage battery 28 is equal to or greater than the threshold value SOC1. When the state of charge SOC of the high-voltage battery 28 is less than the threshold value SOC1, the determination result of ST2 is negative and rewriting of software is prohibited in ST3 corresponding to the control function of the high-voltage battery residual capacity determining unit 58. When the state of charge SOC of the high-voltage battery 28 is equal to or greater than the threshold value SOC1, the determination result of ST2 is positive and the routine proceeds to ST10.

In ST10 corresponding to the control function of the auxiliary-machinery charging control unit 56, auxiliary-machinery charging control for stepping down the output voltage of the high-voltage battery 28 and charging the auxiliary-machinery battery 40 is performed by switching the SMR 32 to the turn-on state and driving the first DCDC 36.

In ST11 corresponding to the control function of the software rewriting control unit 54, new software is rewritten to the ROM of a predetermined ECU which is different from the HVECU 12. In ST12 corresponding to the control function of the software rewriting control unit 54, it is determined whether rewriting of software has been completed. When rewriting of software has not been completed, the determination result of ST12 is negative, the routine returns to ST11, and the rewriting of software continues to be performed. When rewriting of software has been completed, the determination result of ST12 is positive and the routine proceeds to ST13.

In ST13 corresponding to the control function of the auxiliary-machinery charging control unit 56, drive of the first DCDC 36 is stopped and the SMR 32 is switched to the turn-off state, whereby the auxiliary-machinery charging control for the auxiliary-machinery battery 40 is stopped.

In this way, electric power of the high-voltage battery 28 is supplied to the auxiliary-machinery battery 40 by performing auxiliary-machinery charging control using the HVECU 12 when software of an ECU which is different from the HVECU 12 is being rewritten, and electric power of the solar battery 104 is supplied to the auxiliary-machinery battery 40 by performing auxiliary-machinery charging control using the solar ECU 110 when software of the HVECU 12 is being rewritten. Accordingly, even when software of any ECU is rewritten, electric power is supplied to the auxiliary-machinery battery 40 and thus electric power of the auxiliary-machinery battery 40 is secured even during rewriting of software. As a result, it is possible to prevent rewriting of software from being stopped due to a shortage of electric power of the auxiliary-machinery battery 40 during rewriting of software.

As described above, according to this embodiment, the solar ECU 110 controls the low-voltage DCDC 108 such that the auxiliary-machinery battery 40 is charged with the solar battery 104, and the auxiliary-machinery battery 40 is charged with the solar battery 104 by the solar ECU 110 when software of the HVECU 12 is rewritten. Accordingly, it is possible to secure electric power for rewriting software of the HVECU 12. When the state of charge SOCs of the solar battery 104 is less than the threshold value SOCs1 at the time of rewriting of software of the HVECU 12, rewriting of software of the HVECU 12 cannot be performed. Accordingly, it is possible to prevent a problem in that travel control of the vehicle is hindered due to a decrease in the state of charge SOCs of the solar battery 104 with charging of the auxiliary-machinery battery 40.

While embodiments of the present disclosure have been described above in detail with reference to the drawings, the present disclosure can be applied to other aspects.

For example, the configurations of the onboard systems 10, 80, and 100 according to the aforementioned embodiments may be embodied in appropriate combinations thereof. For example, the onboard system 80 according to the second embodiment can be appropriately modified by adding the AC charger 30 which is provided in the onboard system 10 and 100 according to the first and third embodiments thereto or the like.

In the onboard system 10 according to the first embodiment, the HVECU 12 controls the SMR 32 and the first DCDC 36 such that charging of the auxiliary-machinery battery 40 is controlled, and the battery ECU 14 controls the CHR 34 and the charging ECU 16 controls the second DCDC 38 such that charging of the auxiliary-machinery battery 40 is controlled, but the electronic control units that control charging of the auxiliary-machinery battery 40 are not limited to the aforementioned combination. For example, the EGECU 18 or the MGECU 20 may control the SMR 32 and the first DCDC 36 such that auxiliary-machinery charging control for the auxiliary-machinery battery 40 is performed. Alternatively, the EGECU 18 or the MGECU 20 may control the CHR 34 and the second DCDC 38 such that auxiliary-machinery charging control for the auxiliary-machinery battery 40 is performed. The present disclosure can be appropriately applied to a case in which other electronic control units (such as the EGECU 18 and the MGECU 20) in addition to the battery ECU 14 and the charging ECU 16 control charging of the auxiliary-machinery battery 40 with the high-voltage battery 28.

In the onboard system 80 according to the second embodiment, the HVECU 12 controls the SMR 32 and the first DCDC 36 such that charging of the auxiliary-machinery battery 40 is controlled, and the ADASECU 82 controls the second DCDC 38 such that charging of the auxiliary-machinery battery 40 is controlled, but the electronic control units that control charging of the auxiliary-machinery battery 40 are not limited to the aforementioned combination. For example, the EGECU 18 or the MGECU 20 may control the SMR 32 and the first DCDC 36 such that auxiliary-machinery charging control for the auxiliary-machinery battery 40 is performed. Alternatively, the EGECU 18 or the MGECU 20 may control the second DCDC 38 such that auxiliary-machinery charging control for the auxiliary-machinery battery 40 is performed. The present disclosure can be appropriately applied to a case in which other electronic control units (such as the EGECU 18 and the MGECU 20) in addition to the ADASECU 82 control charging of the auxiliary-machinery battery 40 with the high-voltage battery 28.

In the onboard system 100 according to the third embodiment, the HVECU 12 controls the SMR 32 and the first DCDC 36 such that charging of the auxiliary-machinery battery 40 is controlled, and the solar ECU 110 controls the low-voltage DCDC 108 such that charging of the auxiliary-machinery battery 40 is controlled, but the electronic control units that control charging of the auxiliary-machinery battery 40 are not limited to the aforementioned combination. For example, the EGECU 18 or the MGECU 20 may control the SMR 32 and the first DCDC 36 such that auxiliary-machinery charging control for the auxiliary-machinery battery 40 is performed. Alternatively, the EGECU 18 or the MGECU 20 may control the low-voltage DCDC 108 such that auxiliary-machinery charging control for the auxiliary-machinery battery 40 is performed. The present disclosure can be appropriately applied to a case in which other electronic control units (such as the EGECU 18 and the MGECU 20) in addition to the solar ECU 110 control charging of the auxiliary-machinery battery 40 with the solar battery 104.

In the onboard systems 10, 80, and 100 according to the first to third embodiments, two DCDC converters that perform auxiliary-machinery charging control for the auxiliary-machinery battery 40 are provided, but the number of DCDC converters is not limited to two and one DCDC converter may be provided. For example, the present disclosure can be applied to a case in which the onboard system 80 according to the second embodiment is modified to a structure including one DCDC converter 122 as illustrated in FIG. 11.

Figure 11:
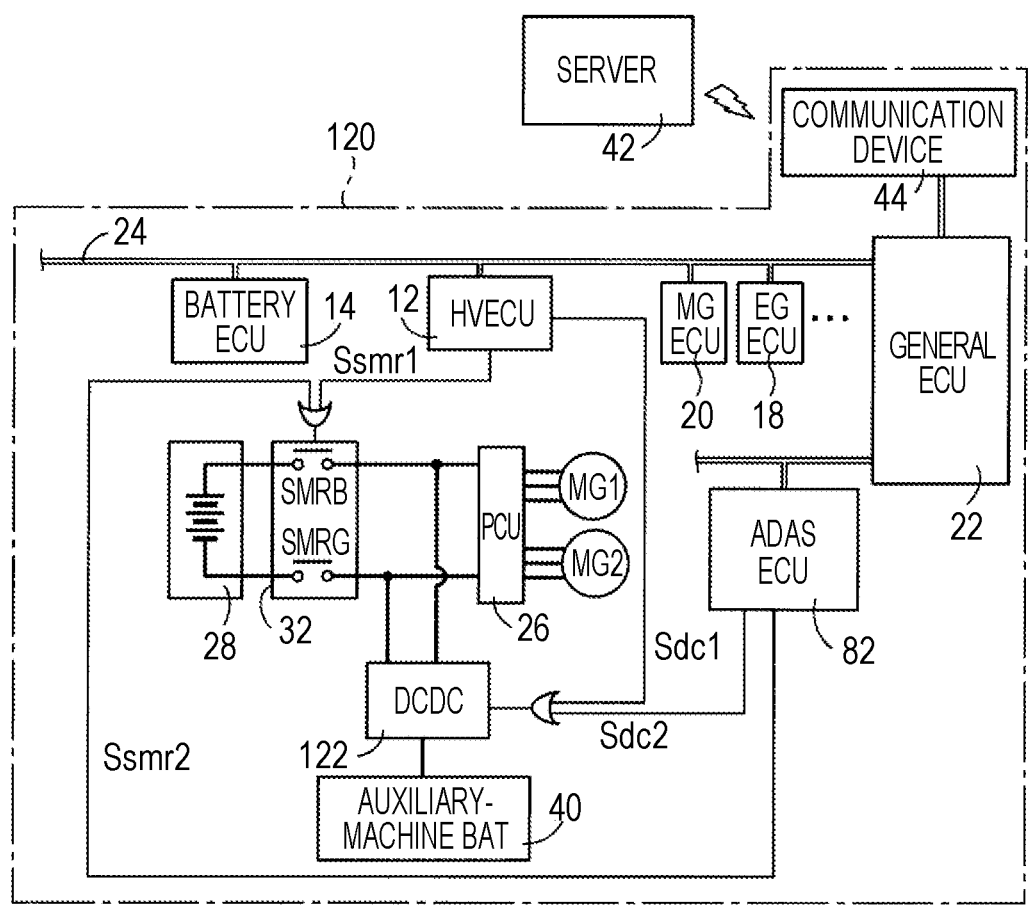
FIG. 11 is a diagram illustrating a configuration of an onboard system that is mounted in a vehicle according to another embodiment of the present disclosure.

In the onboard system 120 illustrated in FIG. 11, the DCDC converter 122 is driven based on instruction signals Sdc1 and Sdc2 from one of the HVECU 12 and the ADASECU 82. The turn-on/off state of the SMR 32 is switched based on instruction signals Ssmr1 and Ssmr2 from one of the HVECU 12 and the ADASECU 82. The present disclosure can also be applied to a case in which the onboard system 120 is configured as described above.

In the onboard system 120, the HVECU 12 controls the SMR 32 and the DCDC converter 122 such that auxiliary-machinery charging control for the auxiliary-machinery battery 40 is performed when software of an ECU which is different from the HVECU 12 is rewritten, and the ADASECU 82 controls the SMR 32 and the DCDC converter 122 such that auxiliary-machinery charging control for the auxiliary-machinery battery 40 is performed when software of the HVECU 12 is rewritten. The present disclosure can also be applied to a case in which the onboard system includes one DCDC converter as described above. In the onboard system 120 illustrated in FIG. 11, the electronic control units that perform auxiliary-machinery charging control for the auxiliary-machinery battery 40 can be appropriately changed.

In the onboard systems 10 and 100 according to the first and third embodiments, since the AC charger 30 is connected to the high-voltage battery 28 via the CHR 34, the auxiliary-machinery battery 40 may be charged with electric power from the external power supply 46 when software of an electronic control unit is being rewritten in a state in which the AC charger 30 is connected to the external power supply 46 via the charging cable 48. For example, in the onboard system 10, when software of the HVECU 12 is rewritten in a state in which the AC charger 30 is connected to the external power supply 46, the charge ECU 16 drives the second DCDC 38 and the auxiliary-machinery battery 40 is charged with electric power from the external power supply 46 via the AC charger 30 and the second DCDC. In this case, since electric power is supplied to the auxiliary-machinery battery 40 regardless of the state of charge SOC of the high-voltage battery 28, it is possible to stably secure electric power of the auxiliary-machinery battery 40.

In the aforementioned embodiment, the second DCDC 38 is connected to the high-voltage battery 28 via the SMR 32, but the second DCDC 38 may be connected to the high-voltage battery 28 via a relay other than the SMR 32.

In the aforementioned embodiment, whether software of an ECU is to be rewritten is determined based on whether the state of charge SOC of the high-voltage battery 28 is equal to or greater than the threshold value SOC1, but this determination is not necessary and may be omitted.

In the aforementioned embodiment, when software of one of the ECUs is rewritten, auxiliary-machinery charging control for the auxiliary-machinery battery 40 is uniformly performed, but a condition in which auxiliary-machinery charging control for the auxiliary-machinery battery 40 such as a condition in which the auxiliary-machinery charging control is performed when the state of charge (the charging capacity, the residual capacity) of the auxiliary-machinery battery 40 is less than a preset threshold value may be newly added.

In the aforementioned embodiment, rewriting of software of an ECU is started when auxiliary-machinery charging control for the auxiliary-machinery battery 40 is started, but rewriting of software may be started at the same time as performing the auxiliary-machinery charging control for the auxiliary-machinery battery 40. A period in which the auxiliary-machinery charging control for the auxiliary-machinery battery 40 is performed is not particularly limited as long as the auxiliary-machinery charging control for the auxiliary-machinery battery 40 is performed in at least a part of a period in which software is rewritten.

In the aforementioned embodiment, the vehicle 8 is a hybrid vehicle using driving forces of the engine, the first rotary machine MG1, and the second rotary machine MG2 as driving force sources for traveling, but the vehicle used for the present disclosure is not limited to a hybrid vehicle. For example, the present disclosure can also be appropriately applied to a vehicle including a charging device that charges an auxiliary-machinery battery with a high-voltage battery such as an electric vehicle using only a rotary machine as a driving force source for traveling.

In the aforementioned embodiment, the general ECU 22 performs software rewriting control, but an applicable embodiment of the present disclosure is not limited to the embodiment in which the general ECU 22 performs software rewriting control. That is, an electronic control unit which is different from the general ECU 22 may perform software rewriting control.

In the first and third embodiments, the AC charger 30 is connected to the high-voltage battery 28 via the CHR 34, but the AC charger 30 is not essential and may be omitted.

The aforementioned embodiments are merely examples and the present disclosure can be subjected to various modifications and improvements based on knowledge of those skilled in the art.

What is claimed is:

1. An onboard system that is mounted in a vehicle, the onboard system comprising:
    a power supply;
    an auxiliary-machinery battery;
    a charging device that charges the auxiliary-machinery battery with electric power from the power supply; and
    a plurality of electronic control units that operates with electric power which is supplied from the auxiliary-machinery battery,
    wherein a first electronic control unit of the plurality of electronic control units is configured to control the charging device such that the auxiliary-machinery battery is charged with the power supply when software of any other electronic control unit of the plurality of electronic control units is rewritten, and
    wherein, when software of the first electronic control unit is rewritten, one or more electronic control units, which are different from the first electronic control unit, among the plurality of electronic control units are configured to control charging of the auxiliary-machinery battery with the power supply.

2. The onboard system according to claim 1, wherein the charging device includes a first charging device and a second charging device that are provided in parallel between the power supply and the auxiliary-machinery battery,
    wherein the first electronic control unit is configured to control the first charging device such that the auxiliary-machinery battery is charged with the power supply, and
    wherein one or more electronic control units which are different from the first electronic control unit are configured to control the second charging device such that the auxiliary-machinery battery is charged with the power supply.

3. The onboard system according to claim 2, wherein the second charging device is configured to be able to be additionally connected to an external power supply, and
    wherein the one or more electronic control units which are different from the first electronic control unit are configured to control the second charging device such that the auxiliary-machinery battery is charged with the external power supply when the second charging device is connected to the external power supply at the time of rewriting of software of the first electronic control unit.

4. The onboard system according to claim 1, wherein rewriting of software of the first electronic control unit is prohibited when a state of charge of the power supply is less than a threshold value which is set in advance at the time of rewriting of software of the first electronic control unit.

5. The onboard system according to claim 1, wherein the power supply includes a first power supply and a second power supply,
    wherein the charging device includes a first charging device that charges the auxiliary-machinery battery with the first power supply and a second charging device that charges the auxiliary-machinery battery with the second power supply,
    wherein the first electronic control unit is configured to control the first charging device such that the auxiliary-machinery battery is charged with the first power supply, and
    wherein the one or more electronic control units which are different from the first electronic control unit are configured to control the second charging device such that the auxiliary-machinery battery is charged with the second power supply.

6. The onboard system according to claim 5, wherein rewriting of software of the first electronic control unit is prohibited when a state of charge of the second power supply is less than a threshold value which is set in advance at the time of rewriting of software of the first electronic control unit.

7. The onboard system according to claim 5, wherein the second power supply is a solar battery.

* * * * *